(No Model.)
A. ROSELL.
ROTARY SIFTING APPLIANCE.
No. 505,849. Patented Oct. 3, 1893.
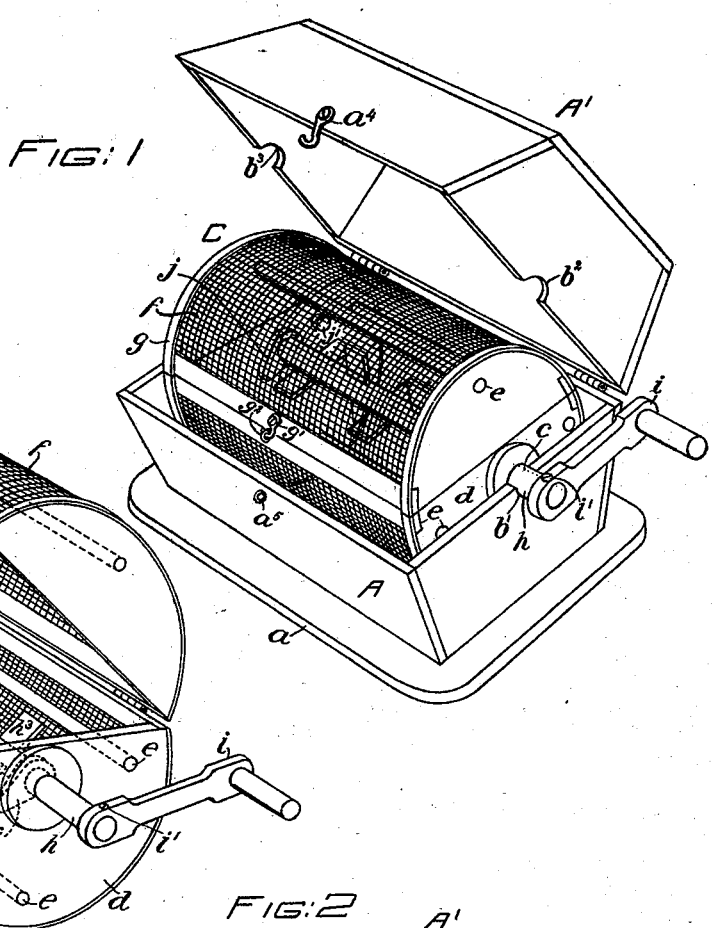
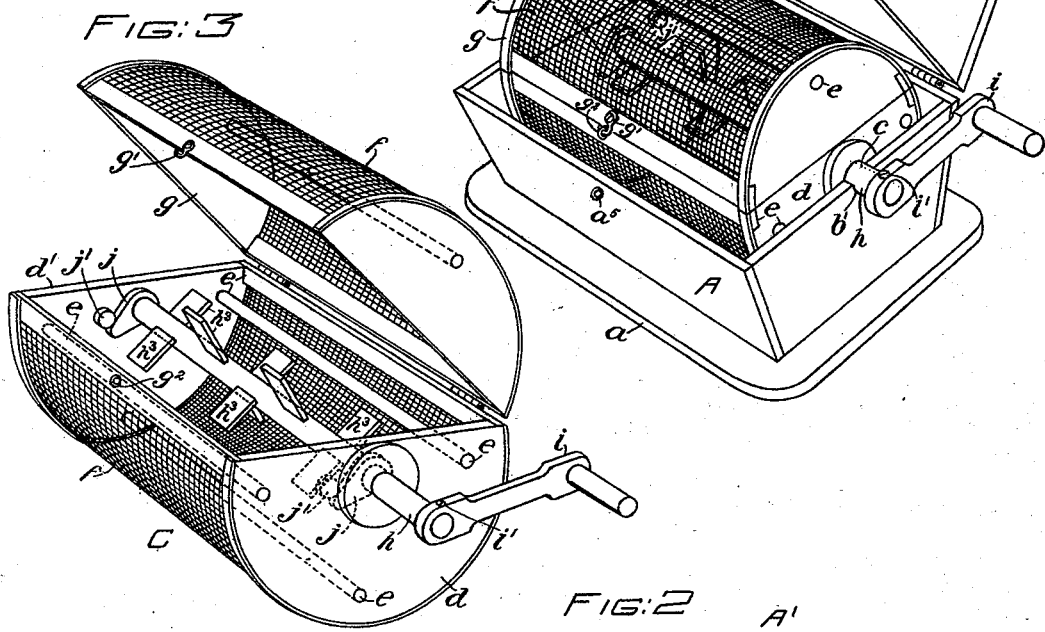
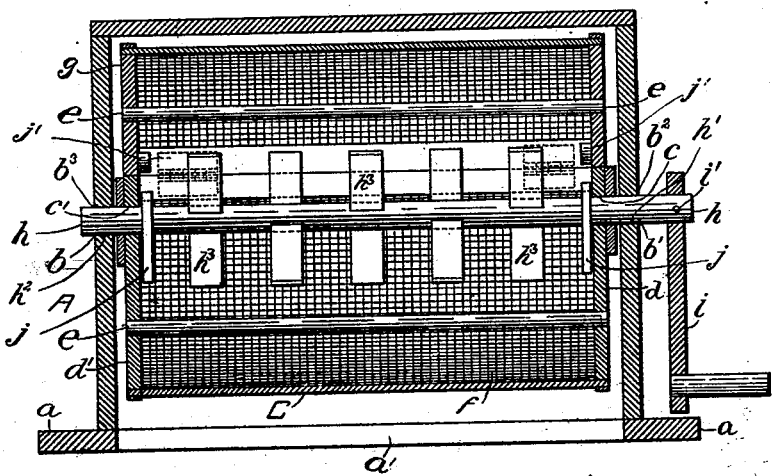
WITNESSES:
INVENTOR:

UNITED STATES PATENT OFFICE.

ARON ROSELL, OF PHILADELPHIA, PENNSYLVANIA.

ROTARY SIFTING APPLIANCE.

SPECIFICATION forming part of Letters Patent No. 505,849, dated October 3, 1893.

Application filed February 1, 1893. Serial No. 460,528. (No model.)

*To all whom it may concern:*

Be it known that I, ARON ROSELL, a subject of the King of Sweden and Norway, but having declared my intention of becoming a citizen of the United States, and now residing at the city of Philadelphia, in the county of Philadelphia and State of Pennsylvania, have invented certain new and useful Improvements in Rotary Sifting Appliances, of which the following is a specification.

My invention has relation to portable appliances for separating or sifting ash and pulverizing or breaking up clinker, cinder or the like; and it relates more particularly to the construction and specific arrangement of an appliance for such purposes.

The principal objects of my invention are first, to provide a simple, durable and efficient portable rotary ash sifter and cinder breaker or separator; second, to provide a portable rotary ash sifter and cinder separator concealed within a housing provided with a hinged-cover and so constructed and arranged as that the sifting, breaking or pulverizing operation is effected without creating a mist or dust around or about the receptacle into which the ash, reduced cinder or like matter is discharged; third, to provide a detachable rotary ash sifter and cinder separator mounted in a housing with a removable cover and the sifter or separator so arranged as to be readily detachable from its bearings or seats provided in the walls of the housing for removing the contents thereof; and fourth, to provide a two-part rotary ash sifter or cinder separator constructed and arranged so as to readily permit of the introduction of matter into the same and of the breaking of the coarse particles therein and of the discharge of the same in a reduced state or condition therefrom.

My invention consists of a portable ash-sifter and cinder-separator constructed and arranged substantially in the manner hereinafter described and claimed.

The nature and characteristic features of my invention will be more fully understood from the following description taken in connection with the accompanying drawings forming part hereof, and in which—

Figure 1, is a perspective view of a detachable rotary ash sifter and cinder separator with the cover of the housing in an elevated position in order to expose to view the internal parts of the same, and the said view illustrating a sifting, breaking and separating appliance embodying features of my invention. Fig. 2, is a central longitudinal section through the rotary sifter or separator, showing the aperture in the bottom of the housing thereof for the discharge of the broken and separated matter into a suitable receptacle beneath the same; and Fig. 3, is a perspective view of the specific construction and arrangement of the rotary sifter or separator drum of my invention detached from its housing with the hinged cover thereof in an elevated position and also showing the journals of the same with a hand-crank applied to one of them and adapted to effect the rotation of the drum.

Referring to the drawings A, is a tapering, funnel-shaped or other preferred form of housing provided with a base-plate $a$, having a central aperture $a'$, therein. The end walls of the housing A, are provided with semicircular recesses $b$ and $b'$, and in a hinged-cover A', of the housing are provided complemental recesses $b^2$ and $b^3$, into which recesses engage the journals $c$ and $c'$, of the sifter or separator drum C. This drum C, is provided with heads $d$ and $d'$, separated from each other and supported rigidly in position by a series of cross-pieces $e$, which serve as beaters or breakers for the deposited matter. Around this frame-work of the drum C, is suitably secured wire netting $f$. This drum C, is provided with a hinged-cover $g$, having applied thereto a catch $g'$, and an eye $g^2$, for holding the cover of the drum in a closed position in the manner illustrated in Fig. 1. Extending longitudinally through the drum C and heads $d$ and $d'$ thereof, is a shaft $h$, the journals $h'$ and $h^2$, of which engage in the recesses in the end walls of the housing A, and cover A' thereof. One of these journals $h'$ or $h^2$ has applied to the same a hand-crank $i$, which is held to place thereon by means of a tightening screw $i'$, or in any other preferred manner. This shaft $h$, is provided with staggered beater or breaker arms $h^3$, projecting thereon. The shaft extending through the body of the drum C, is provided with a pawl $j$, engaging with a stop $j'$, secured to the internal surface of the head $d$ or $d'$, whereby the drum is engaged and rotated and the deposited matter thoroughly broken up in the rotation of the drum by contact of the matter with the cross-pieces $e$ and staggered beater or breaker arms $h^3$, of the device, preparatory to the discharge of the matter in a more or less powdered or reduced condition through the openings in the meshes of the netting of the drum C and the aperture $a'$, in the base-plate $a$, of the housing into a suitable receptacle, provided to receive the same.

The operation of the appliance hereinbefore described is as follows:—The portable housing A, is placed upon a suitable receptacle. The drum C, is then caused to assume the position illustrated in Fig. 1, with the matter to be broken up, sifted and separated deposited therein and with the hinged cover of the drum C, latched to the eye $g^2$, thereof. The hinged-cover A', of the housing is then locked to position with the latch $a^4$, brought into engagement with the eye $a^5$, screwed into the front-wall of the housing, and the hand-crank $i$, is then revolved around and around, thereby rotating the sifter or separator drum C, and breaking up the clinker, cinder or analogous matter into a more or less powdered condition, which is discharged as ash or fine particles through the housing and the aperture $a'$, in the base plate thereof, into a receptacle beneath the same. When the foregoing breaking up, separating or sifting operation has been continued for a time, the cover A', of the housing is unlatched and caused to assume an elevated position and the sifter or separator drum C, removed and the hinged-lid $c$, caused to assume an elevated position in order to permit of the coarse particles, clinker, partially burned fuel or cinder contained in the drum, to be discharged or dumped therefrom.

The advantageous features of the appliance described are first, simplicity in construction and arrangement; second, that during the sifting or separating operation the dust or mist arising therefrom is confined to the interior of the closed housing, so that the objections hitherto existing in the use of devices for separating ash from cinder or from partially burned or consumed fuel, are entirely obviated; and third, the clinker or like matter is thoroughly broken up or pulverized preparatory to the discharge of the same from the appliance, and thus leaving therein the matter required to be preserved.

Having thus described the nature and objects of my invention, what I claim as new, and desire to secure by Letters Patent, is—

1. The combination, in a breaking, sifting or separating appliance, of a housing provided with a hinged-cover latched thereto, a detachable rotary sifter or separator drum provided with a hinged cover and with cross-pieces, a shaft provided with beater or breaker arms, a pawl connected therewith and adapted to engage with a stop secured to the end wall of said drum, and the journals of said shaft held in recesses provided in the end-walls of the housing and the cover thereof, and a crank-arm applied to one of the journals of the movable shaft of said sifter, breaker or separator drum, substantially as and for the purposes described.

2. The combination, in a breaking, sifting or separating appliance, of a housing provided with a hinged-cover adapted to be secured to said housing having a base-plate provided with a central aperture, a detachable drum provided with a hinged lid surrounded with wire netting, a stop or stops secured to said drum, cross-pieces connected with the head of said drum, a staggered beater or breaker shaft journaled to said housing and provided with a pawl and a crank-arm applied to one of the journals of the movable shaft of said drum, substantially as and for the purposes described.

In witness whereof I have hereunto set my signature in the presence of two subscribing witnesses.

ARON ROSELL.

Witnesses:
RICHARD C. MAXWELL,
J. WALTER DOUGLASS.